United States Patent [19]

Schewe et al.

[11] Patent Number: 4,652,957
[45] Date of Patent: Mar. 24, 1987

[54] MAGNETIC WRITE/READ HEAD FOR RECORDING MEDIUM WHICH CAN BE MAGNETIZED PERPENDICULARLY COMPRISING A MAGNETICALLY CONDUCTING BODY HAVING TWO POLE LEGS WITH MEANS FOR INHIBITING OPERATION OF AT LEAST ONE POLE LEG DURING WRITING

[75] Inventors: Herbert Schewe, Herzogenaurach; Heinrich Diepers, Höchstadt, both of Fed. Rep. of Germany

[73] Assignee: Siemens Aktiengesellschaft, Munich, Fed. Rep. of Germany

[21] Appl. No.: 633,002

[22] Filed: Jul. 20, 1984

[30] Foreign Application Priority Data

Aug. 19, 1983 [DE]  Fed. Rep. of Germany ....... 3330075

[51] Int. Cl.$^4$ ............................ G11B 5/14; G11B 5/20
[52] U.S. Cl. ................................. 360/125; 360/123; 360/126; 360/127
[58] Field of Search ............................. 360/125–127, 360/123

[56]  References Cited

U.S. PATENT DOCUMENTS 4,287,544  9/1981  Lazarri ............................. 360/131

OTHER PUBLICATIONS

Hoagland, "Combined . . . Head", IBM Tech. Disc. Bull., vol. 20, No. 8, Jan. 1978, p. 3311.
IEEE Transactions of Magnetics: vol. Mag. 16, No. 1, Jan. 1980, pp. 71–76, vol. Mag. 19. No. 5, Sep. 1980, pp. 967–972, vol. Mag. 17, No. 6, Nov. 1981, pp. 2538–2540 and 3120–3122, vol. Mag. 18, No. 6, Nov. 1982, pp. 1158–1163 and 1170–1172.
Weichmagnetische Werkstoffe, 3d ed. 1977, pp. 128 and 290–292.

Primary Examiner—Robert S. Tupper
Attorney, Agent, or Firm—Kenyon & Kenyon

[57]  ABSTRACT

A magnetic write/read head for a recording medium to be magnetized perpendicularly is disclosed. The head contains a conduction body for carrying the lines of magnetic flux, two pole legs which are arranged adjacent the other in the direction of relative motion of the head and medium and having a predetermined distance from each other. At least one coil winding is associated with the two pole legs. The magnetic head is of a mechanical design which ensures a switchable write and read function with high efficiency. One of the two pole legs has a region of reduced cross section. A separate coil winding is associated with each pole leg and, for performing the write function, this region can be driven into magnetic saturation by means of a coil winding which is associated with the pole leg having the region of reduced cross section. Additionally, one of the two pole legs may include a region of magnetizable material having a predetermined Curie temperature which can be heated during the write function above the Curie temperature.

17 Claims, 4 Drawing Figures

MAGNETIC WRITE/READ HEAD FOR RECORDING MEDIUM WHICH CAN BE MAGNETIZED PERPENDICULARLY COMPRISING A MAGNETICALLY CONDUCTING BODY HAVING TWO POLE LEGS WITH MEANS FOR INHIBITING OPERATION OF AT LEAST ONE POLE LEG DURING WRITING

BACKGROUND OF THE INVENTION

The present invention relates to magnetic heads and particularly to a magnetic write/read head for a recording medium wherein the recording medium is provided with at least one magnetizable storage layer which contains a magnetically anisotropic material, of which the axis of easy magnetization is aligned substantially perpendicularly to the surface of the medium and into which information can be written along a track by perpendicular magnetization of the storage layer. Such magnetic heads have a magnetic conductor body for carrying the magnetic flux having two pole legs which are arranged adjacent the other (one behind the other) in the direction of relative motion of the head and medium and have a predetermined distance from each other. At least one coil winding is associated with the pole legs, whereby, for performing the read function, the flux conduction directions in the two pole legs are arranged at least largely anti-parallel at the ends of the pole legs facing the recording medium. Such a magnetic head is known from DE-OS No. 29 24 013, corresponding to U.S. Pat. No. 4,287,544.

The principle of perpendicular magnetization for the storage of information is generally known, see, for instance, "IEEE Transactions of Magnetics," vol. MAG-16, no. 1, January 1980, pages 71 to 76 or the above-mentioned DE-OS No. 29 24 013. In order to employ this principle, which is often also called vertical magnetization, special recording media, for instance, in the form of a rigid magnetic storage disc, a flexible individual disc (floppy disc) or magnetic tape are required. Such recording medium has at least one magnetizable storage layer of predetermined thickness which contains a magnetically anisotropic material, particularly of a CoCr alloy of which the axis of easy magnetization is aligned perpendicularly to the surface of the medium. By means of a separate write head the individual bits of information are then written along a track in successive sections, also called cells or blocks, by magnetization of the storage layer. In practice, the magnetic flux changes, i.e., the transitions from one direction of magnetization to the opposite one, are generally used to record bits of information. The sections have a predetermined dimension in the longitudinal direction of the track which is also called a wavelength. This dimension can be substantially smaller than the limits given by the method of longitudinal storage by demagnetization, so that the information density in the recording medium can be increased advantageously by the principle of vertical magnetization.

With the principle of vertical magnetization, problems arise, however, in the development of corresponding combined write/read heads. In particular, difficulties arise with these heads due to the desired flux conduction in a circuit closed as far as possible having low magnetic resistance.

A suitable combined write/read head, i.e., a magnetic head with which the write as well as also the read function can be performed, comprises, in general, a so-called main pole, by which a sufficiently strong vertical magnetic field is generated for remagnetizing the individual sections in the storage layer. The necessary return for the flux can then take place, for instance, by a so-called auxiliary pole on the opposite side of the recording medium. See the mentioned literature reference "IEEE Trans. Magn.," vol. MAG-16. In addition, a return by leakage flux is also known. See "IEEE Trans. Magn.," vol. MAG-18, no. 6, Nov. 1982, pages 1170 to 1172.

A return can also be realized with a separate auxiliary pole which is located on the same side as the main pole. See "IEEE Trans. Magn.," vol. MAG-17, no. 6, Nov. 1981, pages 3120 to 3122 or vol. MAG-18, no. 6, Nov. 1982, pages 1158 to 1163, or German DE-OS No. 29 24 013 mentioned above. Accordingly, the magnetic write and read head known from DE-OS No. 29 24 013 contains on its foreward end face, as seen in the direction of motion of the recording medium moving below it, an auxiliary pole and on its back side the main pole proper. This main pole is formed by a pole leg which comprises essentially a thin pole piece which extends perpendicularly to the direction of motion and is applied to a non-magnetic substrate. The auxiliary pole, which has a larger dimension as seen in the direction of motion and is disposed in front of the main pole, is formed by a pole leg which is composed of several thin pole pieces arranged perpendicularly to the direction of motion, with interposed insulating layers, and which is separated from the main pole via an air gap. The extent of this air gap is relatively large and is, for instance, on the order of 5 to 10 $\mu$m. In the air gap is arranged an electrical winding by which the main pole can be excited for the write function and the excitation of the main pole can be registered for the read function. The auxiliary pole serves in any case only for returning the flux. Possible concurrent writing of the auxiliary pole can be tolerated because it is always followed by the writing main pole and information that might have been written by the auxiliary pole is written over unless the width of the auxiliary pole is larger than that of the main pole, and thus already written adjacent tracks remain uninfluenced. In addition, the larger cross section of the auxiliary pole as compared to the main pole and the relatively large extent of the air gap are also necessary in order to assure a sufficient reduction of the magnetic flux density at the auxiliary pole. Concurrent reading of the auxiliary pole can, however, lead to difficulties in information detection.

The remaining space of the air gap which is facing the recording medium and is not filled by the electric winding must be filled by a so-called insulating gap layer. This gap layer should comprise a material as hard as possible such as $Al_2O_3$ in order to prevent notches or washouts during the manufacture of the head, since such unevennesses can lead to a crash, with the recording medium, of the magnetic head, which is guided at an extremely small distance, due to deposited dirt particles. It has been found, however, that the manufacture of this gap layer disposed between the main pole and the auxiliary pole is extremely difficult.

Due to the mentioned difficulties in reading with the known combined write-and-read head, the functions of writing and reading also can be carried out with separate heads, so that these heads can be optimally adapted to the respective functions. See, for instance, "IEEE Trans. Magn.," vol, MAG-16, no. 5, Sept. 1980, pages 967 to 972. For reading, known toroidal heads can be used, while writing must be carried out with special heads. A write head suitable for this purpose has, for instance, on its side facing the storage layer of the recording medium, a main pole, also designated as a single- pole head with a longitudinal dimension of, for instance, 3 μm, opposite to which is disposed a substantially larger auxiliary pole on the backside of the recording medium. The second head, required only for reading, is a known toroidal head and has a gap width of, for instance, 0.2 μm. See "IEEE Trans. Magn.," vol. MAG-17, no. 6, Nov. 1981, pages 2538 to 2540. Corresponding devices for reading and writing with heads specially adapted to the respective functions are relatively expensive to design.

SUMMARY OF THE INVENTION

It is an object of the present invention to improve the magnetic write/read head mentioned above, such that the mentioned problems of such combined heads are reduced as far as their mechanical design is concerned and, secondly, so that a switchable write and read function with high efficiency is assured.

These and other objects of the present invention are achieved by providing one of the pole legs of the magnetic head with a region of reduced cross section, and a separate coil winding associated with each pole leg. During a write operation, the coil winding associated with the pole leg having the region of reduced cross section drives the region of reduced cross section into magnetic saturation.

The advantages connected with this embodiment of the magnetic head are, in particular, that the region of reduced cross section of the one pole leg driven into saturation for the writing function, acts like a blockage for the magnetic flux in this leg, so that this pole leg practically does not participate in the write function. The magnetic head therefore writes the information into the recording medium with the other pole leg as a quasi single-pole head. Since flux changes are considerably smaller in reading than in writing, there is no danger that the pole leg with the region of reduced cross section is magnetically saturated at this point. The magnetic head can therefore be operated for the read function as a ring head in a manner known per se. For this reason, the distance between the pole leg ends can also be kept advantageously very small, so that the head has correspondingly good reading properties. In addition, the danger of wash-outs of the gap formed between these ends is eliminated, at least to a large extent.

According to another embodiment of the invention, one of the pole legs has a region of magnetizable material having a predetermined Curie termperature, and means are provided to heat this region during the writing function above the Curie temperature. This makes the pole leg paramagnetic in this region, i.e., the permeability then becomes approximately 1, so that this region practically acts like an air gap with correspondingly high reluctance for the flux in the pole leg. In this manner a magnetic field with a very pronounced vertical component, which serves for writing information into the recording medium, can advantageously be concentrated in the other pole leg.

Other objects, features and advantages of the present invention will be apparent from a reading of the detailed description below.

BRIEF DESCRIPTION OF THE DRAWINGS

The invention will be explained in greater detail in the following detailed description, with reference to the drawings, in which.

DETAILED DESCRIPTION OF THE DRAWINGS

Figure 1:
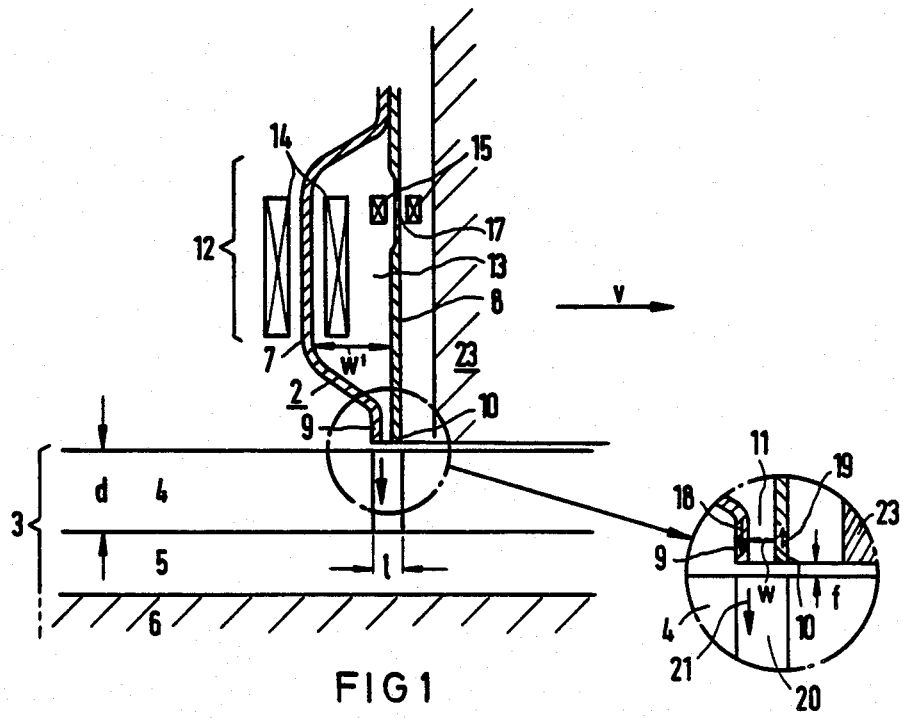
FIG. 1 is a longitudinal cross-sectional view of a magnetic head according to the invention.

With reference now to the drawings, a write/read magnetic head according to the invention is shown in FIG. 1 in a longitudinal section. The starting point is a known head such as shown, for instance, from DE-OS No. 29 24 013 mentioned above. The head is designated generally by 2 in the figure, and is shown during its write function according to the principle of vertical magnetization. The head is disposed on the end face or back side of a conventional part which is an aerodynamic body and which is not detailed in the figure. The head can be guided relative to a recording medium 3 known per se at a small distance of, for instance, 0.2 μm above the medium. The recording medium is guided, for instance, under the magnetic head. The relative direction of motion of the magnetic head 2 with respect to the recording medium 3 is indicated by the arrow labelled v.

The recording medium 3, for instance, a magnetic storage disc, has a storage layer 4, in particular, of a CoCr-alloy which has a predetermined thickness d. This layer can optionally be joined on the side facing away from the magnetic head 2, to a magnetically soft layer 5, for instance, of a special NiFe-alloy. The storage layer 4, and if applicable, the layer 5, are deposited on the flat top side of a carrier body 6 of the recording medium 3.

The magnetic head 2 comprises two pole legs 7 and 8 which are aligned, and in particular, at their ends 9 and 10 facing the recording medium 3, substantially approximately perpendicularly to the surface of the recording medium 3. Between the pole leg ends, an air gap 11 having an advantageously small longitudinal width w pointing in the direction of motion, of e.g., under 1 μm, and particularly under 0.3 μm, is formed, as shown by the area of detail. In a central zone 12, the distance between the two pole legs 7 and 8 is made wider than the gap width w, inasmuch as, for instance, the pole leg 7 which is to the rear with respect to the direction of motion, is curved in this zone to form a larger distance w' with respect to the forward pole leg 8, which is made straight. Into the space 13 between the legs 7 and 8 in the zone 12, at least parts of each pole leg are surrounded by coil windings 14 and 15 associated with the respective pole legs. Outside this zone, on the side facing away from the recording medium 3, the pole legs are joined together in a known manner as shown.

Figure 2:
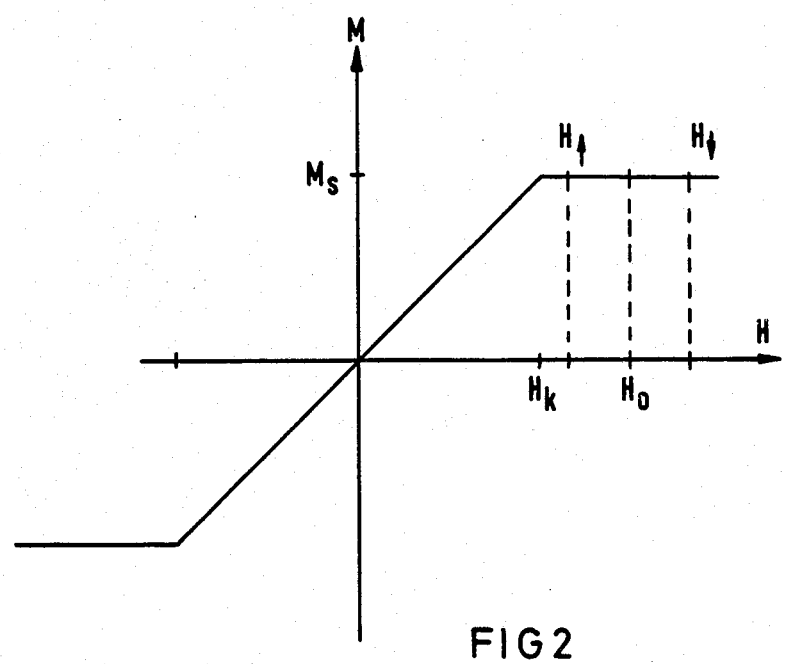
FIG. 2 is a diagram showing a magnetization curve for the magnetic head of FIG. 1.

According to the invention, one of the two pole legs, for instance, the pole leg 8, has a narrowed region 17, the cross section of which is substantially smaller, and in particular, at least three times smaller than the cross section of the other parts of the pole leg. A coil winding 15 is disposed about this region 17. With this winding, a sufficiently strong and constant magnetic field can be generated to drive the material of the pole leg 8 in this region into magnetic saturation, as shown by the curve of FIG. 2. This region 17 then acts like a magnetic blockage for the magnetic flux which is generated by the coil winding 14 associated with the other pole leg 7 and which is indicated by arrow 18. At the end 10 of the pole leg 8 having the constricted region 17, at most a minimal magnetic flux is provided which is indicated by arrow 19, so that the write function is executed practically only by the magnetic flux 18 of the other pole leg 7. The magnetization so obtained of a section 20 in the storage layer 4 is illustrated by arrow 21. While the longitudinal extent 1 of this storage section 20 is shown to be on the order of magnitude of the corresponding distance between the outer edges of the pole leg ends 9 and 10, this dimension 1 is generally smaller, so that practically a higher information density in the recording medium 3 is achieved with the magnetic head 2 according to the invention, than would correspond to the geometric extent of the two pole legs. See, for instance, also "IEEE Trans. Magn.," vol. MAG-17, no. 6, Nov. 1981, pages 2538 to 2540.

For the read function, the two coil windings 14 and 15 can be connected in series in order to increase the signal voltage produced. An undesirable saturation in the constricted area 17 is not expected.

In the fabrication of the magnetic head 2 by a thin-film technique, a substrate 23 is generally used which comprises, for instance, TiC and $Al_2O_3$. If required, the substrate 23 can be provided with a sufficiently thick insulating layer, for instance, of $Al_2O_3$. For the construction of the pole legs 7 and 8, thin magnetic layers of special NiFe alloys such as Permalloy (Ni/Fe-81/19) or FeB may be applied by sputtering, vapor deposition or electroplating, and are separated from each other by a nonmagnetic layer of, for instance, $SiO_2$ or $Al_2O_3$. The magnetization of these magnetic layers is in the plane of the layer. Due to the manufacturing process, the magnetic layers have uniaxial anisotropy, i.e., each magnetic layer has two anisotropic axes turned by 90°, which are designated, respectively, as the easy or the difficult (hard) directions of magnetization. The magnetization is preferably parallel or antiparallel to the easy direction. The easy direction of the magnetic layers can be induced, for instance, by an applied magnetic field, for instance, when the respective layer is deposited.

The different grown-on layers are produced by techniques known per se, such as photolithography, plasma, ion beam or wet-chemical etching, and the two pole legs 7 and 8 of the magnetic head 2 are thereby made. The easy direction of magnetization of the magnetic layers is, in general, perpendicular to the direction of the magnetic flux in the pole legs, i.e., substantially parallel to the surface of the recording medium 3 in the region of the ends 9 and 10. After one pole leg 8 is deposited, an insulating layer, for instance, $SiO_2$ is applied, and subsequently, the coil windings 14 and 15, which are required for reading in and/or out the data in the magnetic storage layer 4 of the recording medium 3, are made. These windings, comprise, for instance, Cu, Au or Al. Since uneven magnetic layers cause a degradation of the magnetic properties, the coil windings 14 and 15 can be finished, if desired, with a polyimide varnish in a manner known per se. Subsequently, the second pole leg 7 is produced. Finally, a relatively thick protective layer, for instance, of $Al_2O_3$, is applied for the protection of the magnetic thin-film head 2.

With the magnetic head 2 shown in FIG. 1, a write function is about to be executed. To this end, magnetizing conditions must be assumed, according to the invention, in the region 17 of reduced cross section, as can be seen from the diagram of FIG. 2. In this figure, the magnetization M in the difficult direction is shown by the curve as a function of the magnetic field strength H. The following designations are chosen: $M_s$ is the saturation magnetization, $H_o$ is the field strength of the constant magnetic field which is generated by the coil 15, and $H_k$ is the anisotropic field strength of the material in the region 17 of reduced cross section. H↑ and H↓ are the field strengths which are obtained in the reduced-cross section region 17 due to the excitation of the coil winding 14, depending on the direction of polarity.

It can be seen from the curve shown that the constant field $H_o$ must be large enough to reach the saturation magnetization $M_s$ in region 17. In addition, the field $H_o$ for this purpose must be large enough so that the magnetic fields $H_o$, H↑ and H↓, are stronger than the anisotropic field strength $H_k$, since plus (↑) as well as minus (↓) directions are written, and H↑ and H↓ are the respective results of the field $H_o$ and of the effect of the field of the leg 7 on the leg 8.

Figure 3:
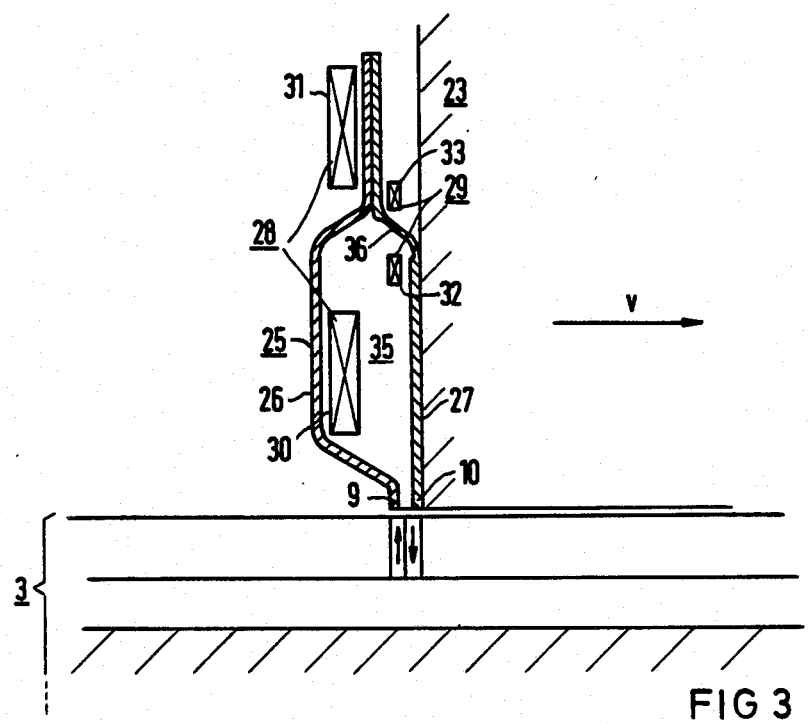
FIG. 3 illustrates an alternative embodiment of a magnetic head according to the invention.

A further embodiment of a magnetic head according to the invention is illustrated in FIG. 3 in a presentation corresponding to FIG. 1 during a read function. Like components are provided with like reference symbols. This magnetic head, designated generally by 25, differs from the magnetic head 2 according to FIG. 1 essentially only by a simplified layer structure, in that a larger number of coil windings stacked on top of each other is avoided. The longitudinal dimension in the direction of motion is accordingly limited. To this end, coil windings 28 and 29 associated with the pole legs 26 and 27, respectively, each comprise two windings parts 30, 31 and 32, 33, respectively, which are arranged on top of each other perpendicularly to the surface of the recording medium 3, as shown in the longitudinal section shown in the figure. Only one winding section 30 or 32 of the coil windings 28 and 29 is accommodated in the space 35 formed between the pole legs 26 and 27, while the other winding sections 31 and 33 are arranged adjacent the pole legs on the upper side facing away from the recording medium 3, where the two pole legs 26 and 27 are joined together. The winding sections 32 and 33 of coil winding 29 are associated with the section 36 of the pole leg 37 having a reduced cross section.

Figure 4:
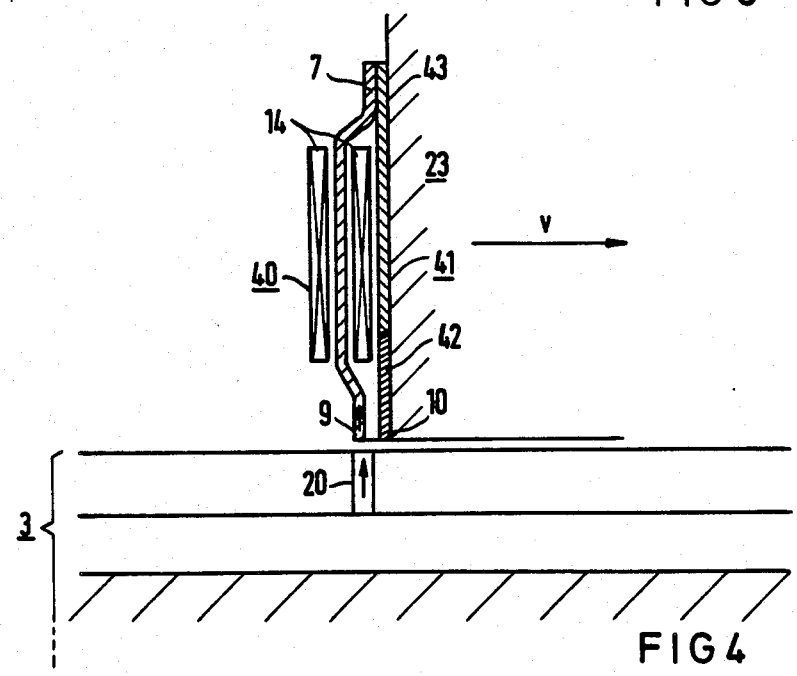
FIG. 4 is a further embodiment of a magnetic head according to the invention.

In the embodiments of the magnetic heads 2 and 25 according to FIGS. 1 and 3, the writing of one of the two pole legs is inhibited by the fact that in this leg a region having a reduced cross section is provided which is driven into magnetic saturation by means of a separate coil winding. A further embodiment for preventing undesired writing by a pole leg is shown in FIG. 4. The magnetic head, which is shown in the figure in longitudinal section and is generally designated by 40, corresponds, in essential part, to the magnetic head 2 according to FIG. 1. Like components are again provided with like reference symbols. In order to prevent writing by pole leg 41 disposed in front, as seen in the direction of motion, by the end 10, pole leg 41 preferably has at its end facing the recording medium 3, a separate region 42 which comprises a magnetizable material which has a predetermined Curie temperature $T_c$. Suitable materials are, for instance, special FeNi alloys, the Curie temperature $T_c$ of which is relatively low. Thus, the alloy known, for instamce, under the Trade Mark THERMOFLUX (registered Trade Mark of the firm Vacuumschmelze GmbH, Hanau) has a nickel content of about 30%, wherein a Curie temperature $T_c$ between 30° and 120° C. can be adjusted by small variations of the composition. See, for instance, "Weich-magnetische Werkstoffe" (magnetically soft materials), publisher: Vacuumschmelze GmbH, and published by Siemens AG: Berlin and Munich, 3rd Edition, 1977, particularly pages 128 and 290 to 292. For writing, the region 42 comprising such a material is heated sufficiently so that its temperature exceeds this Curie temperature $T_c$. This makes the region 42 paramagnetic so that it practically represents a correspondingly high reluctance for the magnetic flux in the pole leg 41, like an air gap. In this manner, only the pole leg 7, which is disposed in back as seen in the direction of motion, and which is excited accordingly by the coil winding 14, writes. The design of coil winding 14 can also be made in accordance with the coil winding 28 shown in FIG. 3.

The heating of the special region 42 beyond the Curie temperature $T_c$ can be accomplished, for instance, by the write current of the winding 14. The region 42 can, of course, also be brought to the desired temperature by an additional device not specifically shown in the figure, for heating to the desired temperature.

Due to the thin-film technology which can be used, the heat capacity of the magnetic head 40 is so small that the head and, in particular, the region 42 of its pole leg 41, is heated up sufficiently quickly. Fast cooling in reading is advantageously promoted by a substrate 23 which preferably comprises a highly heat-conducting material. During cooling, the anisotropic direction of the magnetic layers of the region 42 will adjust itself preferably parallel to the magnetic layers of the region 42 by the stray fields of the magnetic layers of the pole leg 7 and through exchange coupling with the magnetic layers of the remaining part 43 of the pole leg 41, so that in reading, the advantageous properties of a longitudinal magnetic head are achieved.

In order to determine, if necessary, whether the magnetic head 40 is ready for writing, i.e., whether the Curie temperature $T_c$ is exceeded, or whether it is ready for reading, the inductance of the coil winding 14 may be measured prior to the writing or reading operation.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In a magnetic write/read head for performing selected ones of a read and write function with respect to a recording medium wherein the recording medium is provided with at least one magnetizable storage layer containing a magnetically anisotropic material having axes of both easy and difficult (hard) magnetization, the axis of easy magnetization of said medium being aligned substantially perpendicularly to the surface of the medium, information being writable into said medium along a track by perpendicular (vertical) magnetization of said storage layer, the magnetic head further comprising a magnetically conducting body for guiding magnetic flux, the conducting body having two pole legs which are arranged adjacently, and one behind the other in a direction of relative motion of the head and medium and having a predetermined distance from each other, coil winding means being associated with said pole legs, and wherein, for performing the read function, the directions of lines of the magnetic flux in the two pole legs extend, at ends of the pole legs facing the recording medium, substantially antiparallel, the improvement comprising said coil winding means comprising a first coil winding associated with one of said two pole legs, the other of said two pole legs having a region of reduced cross section which is at least three times smaller than the cross section of other parts of said pole leg and a separate second coil winding being associated with said pole leg having said region of reduced cross section, whereby, for performing the write function, said region of reduced cross section is driven into magnetic saturation by said separate second coil winding and said first coil winding is energized to perform the write function, the magnetic field components generated in the pole leg having said region of reduced cross section by excitation of said separate second coil winding by a constant current and by the excitation of said first coil winding associated with the other pole leg in a direction parallel or antiparallel to the direction of an axis of difficult magnetization of the material in said region, said magnetic field components being greater than the anisotropic field strengnth in said region, said pole leg associated with said first coil winding also being used to perform said read function.

2. The improvement recited in claim 1 wherein said two pole legs comprise, at least partially, a magnetically soft material.

3. The improvement recited in claim 1 wherein said two pole legs comprise a material having an axis of easy magnetization substantially directed perpendicularly to the direction of the lines of magnetic flux.

4. The improvement recited in claim 1, wherein a distance substantially parallel to the recording medium between the ends of said pole legs facing the recording medium is less than about 1 $\mu$m.

5. The improvement recited in claim 1 wherein said predetermined distance between the pole legs is enlarged from a distance between the ends of the pole legs facing the recording medium to a larger distance so as to form a space, wherein, at least partly, said two coil windings are disposed.

6. The improvement recited in claim 5 wherein each coil winding comprises two winding sections wherein one of the winding sections of each winding is disposed in the enlarged space and the other winding sections of each winding are disposed in a region wherein the two pole legs are joined together on a side facing away from the recording medium.

7. The improvement recited in claim 1 wherein said pole legs are at least partly thin-film structures applied on a plane substrate body.

8. The improvement recited in claim 7 wherein said coil windings are thin-film structures applied on one of said substrate body or on one of said pole legs.

9. In a magnetic write/read head for performing selected ones of a write and a read function with respect to a recording medium, wherein the recording medium is provided with at least one magnetizable storage layer containing a magnetically anisotropic material having axes of both easy and difficult (hard), magnetization, the axis of easy magnetization of said medium being aligned substantially perpendicularly to the surface of the medium, information being writable into said medium along a track by perpendicular (vertical) magnetization of said storage layer, the magnetic head further comprising means for guiding magnetic flux, the guiding means having two pole legs disposed adjacently and one behind the other in the direction of relative motion of the head and medium and having a predetermined distance from each other, coil winding means being associated with at least one of said two pole legs, and wherein, for performing the read function, the directions of the lines of magnetic flux in the two pole legs extend, at ends of the pole legs facing the recording medium, substantially antiparallel, the improvement comprising one of said two pole legs having a region of magnetizable material having a predetermined Curie temperature, and means for heating said region during the performance of the write function beyond the Curie temperature.

10. The improvement recited in claim 9 wherein said two pole legs comprise, at least partially, a magnetically soft material.

11. The improvement recited in claim 9 wherein said two pole legs comprise a material having an axis of easy magnetization substantially directed perpendicularly to the direction of the lines of magnetic flux.

12. The improvement recited in claim 9, wherein a distance substantially parallel to the recording medium between the ends of said pole legs facing the recording medium is less than about 1 μm.

13. The improvement recited in claim 9 wherein said predetermined distance between the pole legs is enlarged from said distance between the ends of the pole legs facing the recording medium to a larger distance so as to form a space, wherein, at least partly, said coil winding means is disposed.

14. The improvement recited in claim 13 wherein said coil winding comprises two winding sections wherein one of the winding sections is disposed in the enlarged space and the other winding section is disposed in a region wherein the two pole legs are joined together on a side facing away from the recording medium.

15. The improvement recited in claim 9 wherein said pole legs are at least partly thin-film structures applied on a plane substrate body.

16. The improvement recited in claim 15 wherein said coil winding is a thin-film structure applied on one of said substrate body or on one of said pole legs.

17. The improvement recited in claim 9 wherein said heating means comprises said coil winding, whereby said coil winding is excited with a write current to generate heat in said region.

* * * * *